(12) United States Patent
Landacre et al.

(10) Patent No.: US 10,774,943 B2
(45) Date of Patent: Sep. 15, 2020

(54) MODULAR VALVE WITH O-RING VALVE SET

(71) Applicant: MAC Valves, Inc., Wixom, MI (US)

(72) Inventors: Brett Anthony Landacre, Bloomfield Hills, MI (US); Matthew Neff, Birmingham, MI (US); Jeffrey Simmonds, Commerce Township, MI (US)

(73) Assignee: MAC Valves, Inc., Wixom, MI (US)

( * ) Notice: Subject to any disclaimer, the term of this patent is extended or adjusted under 35 U.S.C. 154(b) by 136 days.

(21) Appl. No.: 15/954,815

(22) Filed: Apr. 17, 2018

(65) Prior Publication Data

US 2019/0316704 A1    Oct. 17, 2019

(51) Int. Cl.
*F16K 31/06* (2006.01)
*F16K 1/38* (2006.01)
*F16K 1/46* (2006.01)
*F16K 25/00* (2006.01)

(52) U.S. Cl.
CPC .......... *F16K 31/0658* (2013.01); *F16K 1/385* (2013.01); *F16K 1/46* (2013.01); *F16K 1/465* (2013.01); *F16K 25/005* (2013.01)

(58) Field of Classification Search
CPC ...... F16K 31/0658; F16K 1/38; F16K 31/465; F16K 25/005
USPC ............................... 251/129.02, 129.15, 357
See application file for complete search history.

(56) References Cited

U.S. PATENT DOCUMENTS

| 2,350,905 A | * | 6/1944 | Koehler | F16K 1/46 251/336 |
| 2,853,659 A | * | 9/1958 | Herion | H01F 7/1607 335/262 |
| 3,379,214 A | * | 4/1968 | Weinberg | F16K 31/082 137/625.5 |

(Continued)

FOREIGN PATENT DOCUMENTS

| DE | 2404174 A1 | 4/1975 |
| EP | 2439433 A2 | 4/2012 |

(Continued)

OTHER PUBLICATIONS

European Search Report for Application No. EP19169248, dated Sep. 11, 2019.

*Primary Examiner* — Matthew W Jellett
(74) *Attorney, Agent, or Firm* — Harness, Dickey & Pierce, P.L.C.

(57) ABSTRACT

A solenoid operated modular valve including a valve body, a valve member slidingly received in the valve body, and a solenoid that moves the valve member relative to the valve body along a longitudinal axis between an open position and a closed position. The valve body has an end face, a side face, and an inner bore. An outlet port in the end face is disposed in fluid communication with the inner bore. An inlet port in the side face is disposed in fluid communication with the inner bore. The valve body includes an O-ring valve seat that is positioned longitudinally between the inner bore and the outlet port. The valve member includes a tapered end that has a frustoconical shape and a valve member abutment surface. The valve member abutment surface contacts the O-ring valve seat when the valve member is in the closed position.

20 Claims, 10 Drawing Sheets

(56) References Cited

U.S. PATENT DOCUMENTS

| | | | | |
|---|---|---|---|---|
| 3,489,170 A * | 1/1970 | Leman | ................... | F16K 1/385 |
| | | | | 137/516.29 |
| 4,074,700 A * | 2/1978 | Engle | ................... | B60T 8/3615 |
| | | | | 137/625.27 |
| 4,546,795 A * | 10/1985 | Okamoto | ........... | F16K 31/0648 |
| | | | | 137/624.15 |
| 5,584,466 A * | 12/1996 | Fukano | ................ | F16K 31/082 |
| | | | | 251/129.15 |
| 5,655,752 A * | 8/1997 | De Villepoix | ....... | F16J 15/0893 |
| | | | | 251/174 |
| 5,967,487 A * | 10/1999 | Cook | ................ | F02M 25/0836 |
| | | | | 251/129.07 |
| 6,065,734 A * | 5/2000 | Tackett | ................... | B60T 8/363 |
| | | | | 251/129.02 |
| 6,113,066 A * | 9/2000 | Hohl | ....................... | B60T 8/363 |
| | | | | 251/129.02 |
| 6,845,965 B2 * | 1/2005 | Lanting | ................... | F16J 15/48 |
| | | | | 251/175 |
| 6,948,697 B2 * | 9/2005 | Herbert | ............... | F16K 31/0672 |
| | | | | 251/129.04 |
| 8,342,479 B2 * | 1/2013 | Chuang | ................... | F16K 1/38 |
| | | | | 251/129.15 |
| 8,576,032 B2 * | 11/2013 | Herbert | ..................... | F16K 7/16 |
| | | | | 251/129.15 |
| 9,016,660 B2 * | 4/2015 | Leventhal | ............... | B60T 8/363 |
| | | | | 251/129.02 |
| 2012/0181464 A1 | 7/2012 | Pfetzer et al. | | |

FOREIGN PATENT DOCUMENTS

| | | |
|---|---|---|
| EP | 2778489 A1 | 9/2014 |
| EP | 2937607 A1 | 10/2015 |
| EP | 3460302 A1 | 3/2019 |

* cited by examiner

MODULAR VALVE WITH O-RING VALVE SET

FIELD

The present disclosure relates to solenoid operated modular valves.

BACKGROUND

This section provides background information related to the present disclosure which is not necessarily prior art.

Solenoid operated valves are frequently used in a variety of different applications, such as in sorters, packaging machines, food processors, and the like. These valves are used to control the flow of a fluid and may be operated for millions of cycles. Solenoid operated valves typically include a coil and an armature. The coil applies an electromagnetic force to the armature when electricity is supplied to the coil (i.e., when the solenoid is energized). A valve member moves longitudinally within a valve body of the solenoid operated valve between an open position and a closed position in response to movement of the armature. The valve body has a valve seat and the valve member has an abutment surface. The abutment surface of the valve member is spaced away from the valve seat of the valve body when the valve member is in the open position and contacts the valve seat of the valve body when the valve member is in the closed position. A biasing member, such as a spring, is used to oppose the electromagnetic force the coil applies to the armature. Depending on the arrangement of the solenoid operated valve, the biasing member may hold the valve member against the valve seat, which is commonly referred to as a normally closed valve, or away from the valve seat, which is commonly referred to as a normally open valve.

In order to provide a leak-proof seal, the abutment surface of the valve member is often formed of an elastomeric material. Typically, the valve member is made of a metal or plastic and the elastomeric material is overmolded or bonded to the metal or plastic of the valve member. In other configurations, the elastomeric material is secured to the valve member by an adhesive. The type of elastomeric material that is used in such valves is limited to materials that are suitable for bonding to the valve member or the adhesive. One drawback to such materials is that they are frequently more susceptible to degradation and/or corrosion when brought into contact with certain fluids. As a result, such valves are not well suited for applications where the fluid running through the solenoid operated valve is corrosive to the elastomeric material forming the abutment surface or corrosive to bonding agents or adhesives used to secure the elastomeric material to the valve member.

SUMMARY

This section provides a general summary of the disclosure, and is not a comprehensive disclosure of its full scope or all of its features.

The subject disclosure provides for a solenoid operated modular valve that includes a valve body, a valve member slidingly received within an inner bore of the valve body, and a solenoid that moves the valve member relative to the valve body along a longitudinal axis between open and closed positions. The valve body has an end face and a side face. An outlet port in the end face is also disposed in fluid communication with the inner bore of the valve body. An inlet port in the side face is also disposed in fluid communication with the inner bore of the valve body. The valve body includes a connection end that is opposite the end face. The solenoid includes a solenoid body that is connected to the connection end of the valve body and a coil that is disposed inside the solenoid body. When the coil of the solenoid is energized, the solenoid moves the valve member relative to the valve body along the longitudinal axis between the open and/or closed positions.

In accordance with one aspect of the subject disclosure, the valve body includes an O-ring valve seat that is positioned longitudinally between the inner bore and the outlet port. Additionally, the valve member includes a tapered end that has a frustoconical shape and a valve member abutment surface. The valve member abutment surface contacts the O-ring valve seat when the valve member is in the closed position and is spaced away from the O-ring valve seat when the valve member is in the open position. As a result, the valve member permits fluid flow through the inner bore and between the inlet and outlet ports in the open position and blocks said flow in the closed position.

Advantageously, the material of the O-ring valve seat does not need to be bonded to the valve member or secured by an adhesive. This means that the material of the O-ring valve seat can be selected for its chemical resistance to degradation and/or corrosion by certain fluids instead of for its ability to bond to the material of the valve member or an adhesive. Accordingly, the integrity of the seal provided by the subject solenoid operated modular valve is improved, particularly in applications where the solenoid operated modular valve is used to control the flow of fluids that attack (e.g., are corrosive to) the elastomeric materials, bonding agents, and/or adhesives used to create the abutment surface of conventional valve members.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly. As used herein, the term "magnetic material" means a material having a magnetic permeability that is greater than 0.000005 henries per meter (H/m) and the term "non-magnetic material" means a material having a magnetic permeability that is less than 0.000005 henries per meter (H/m).

Figure 1:
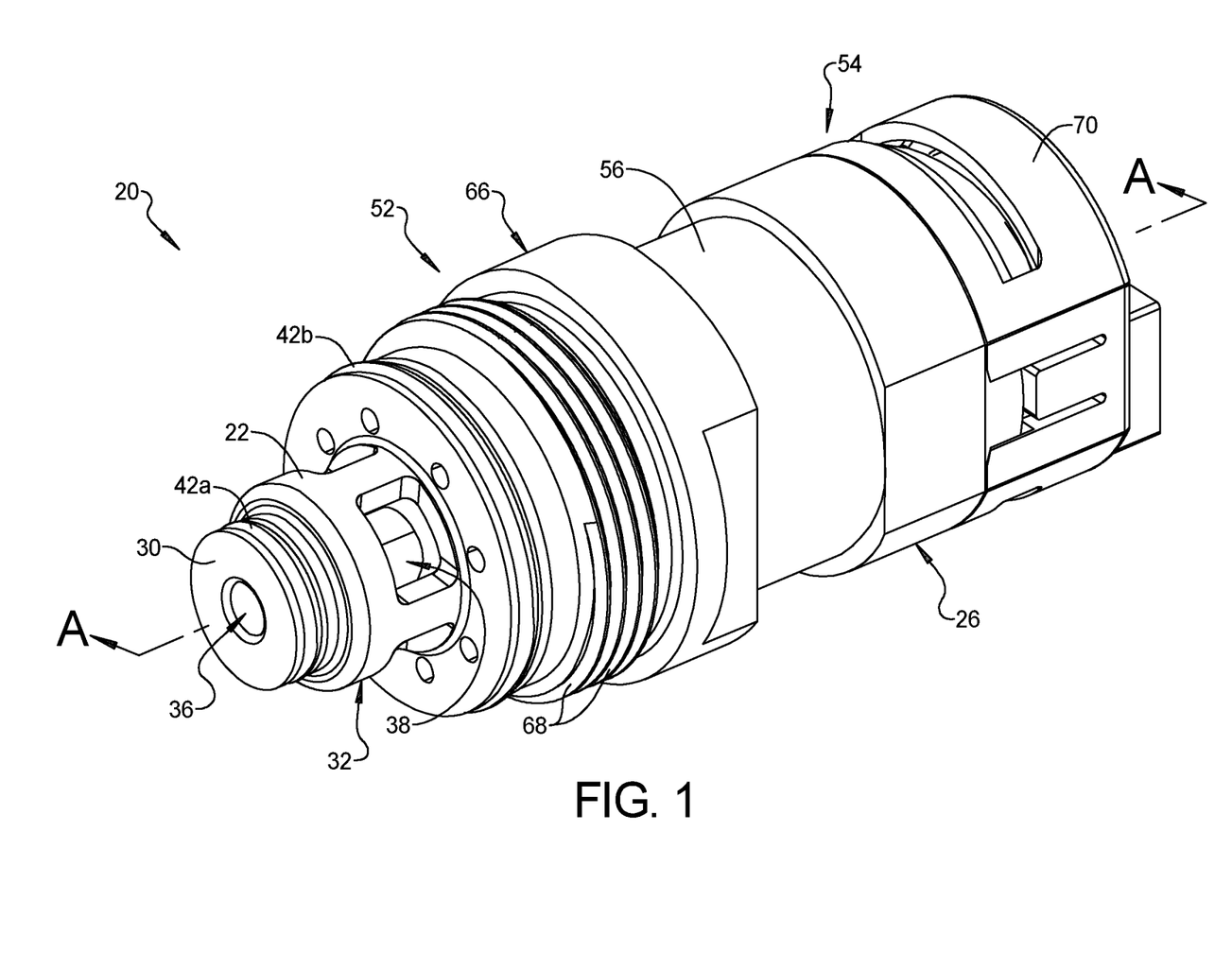
FIG. 1 is a front perspective view of an exemplary normally closed modular valve constructed in accordance with the teachings of the present disclosure.
Figure 2:
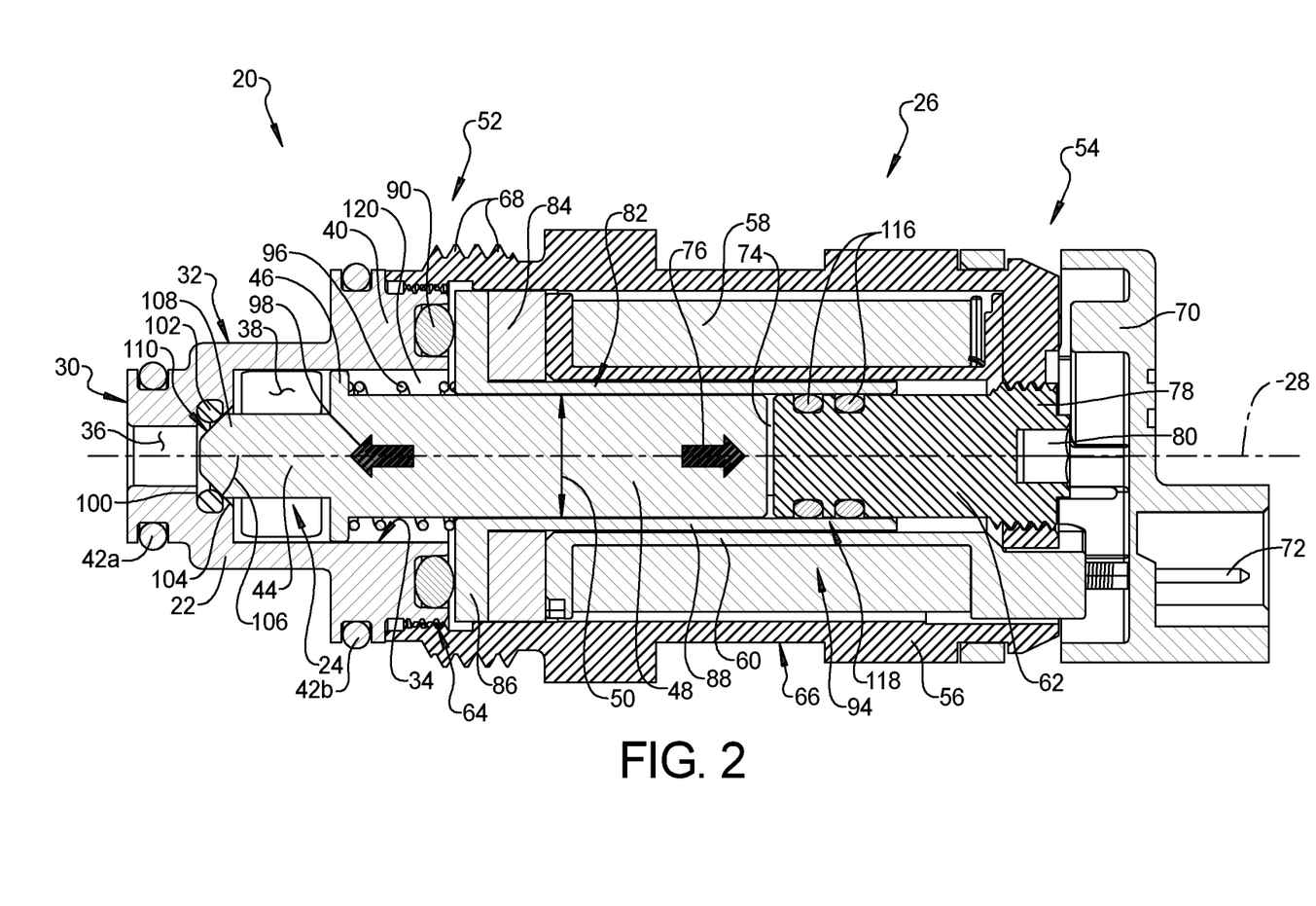
FIG. 2 is a side cross-sectional view of the exemplary normally closed solenoid operated modular valve shown in FIG. 1 taken along section line A-A where the valve member is illustrated in a closed position.
Figure 3:
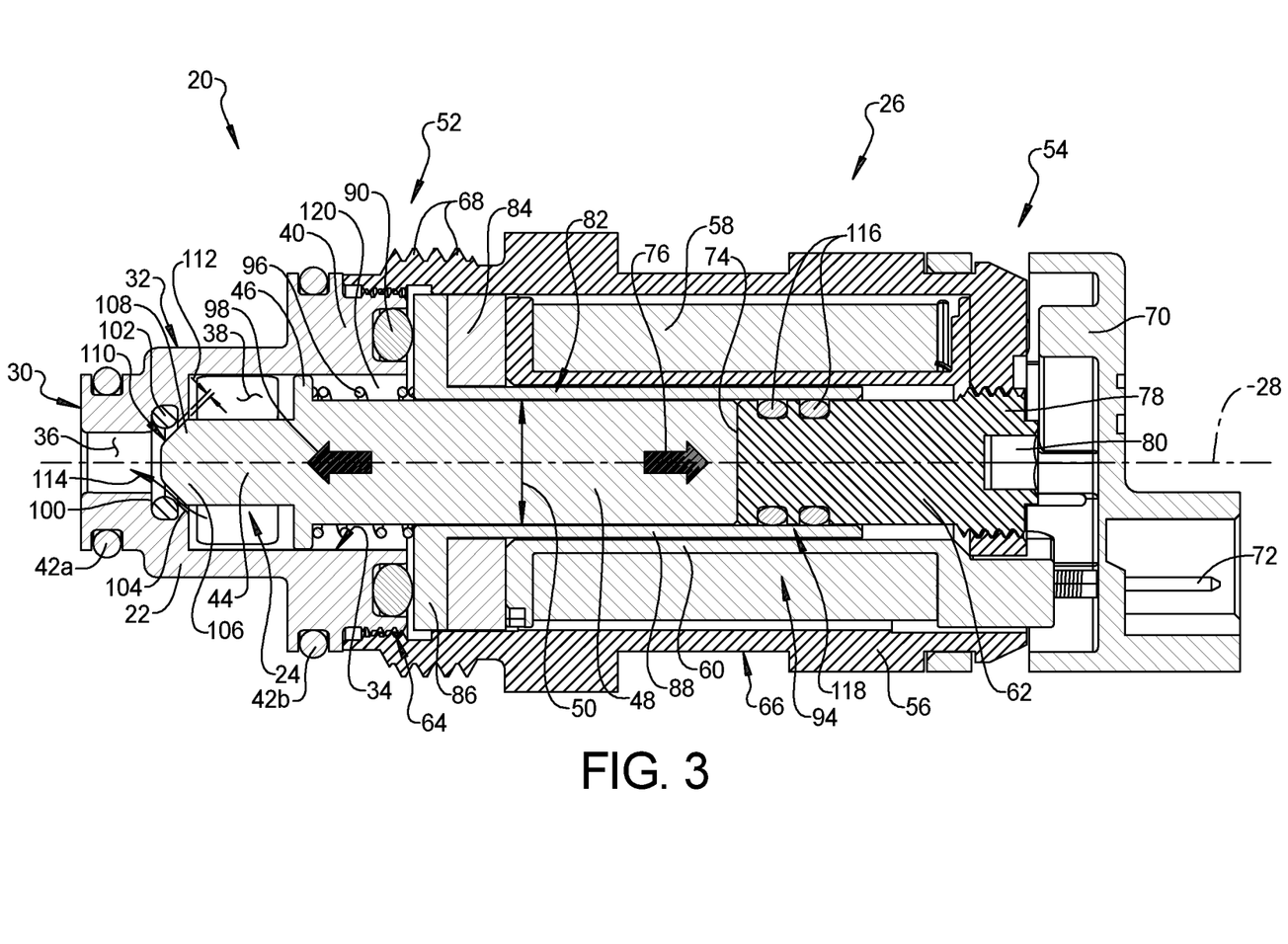
FIG. 3 is a side cross-sectional view of the exemplary normally closed solenoid operated modular valve shown in FIG. 1 taken along section line A-A where the valve member is illustrated in an open position.
Figure 4:
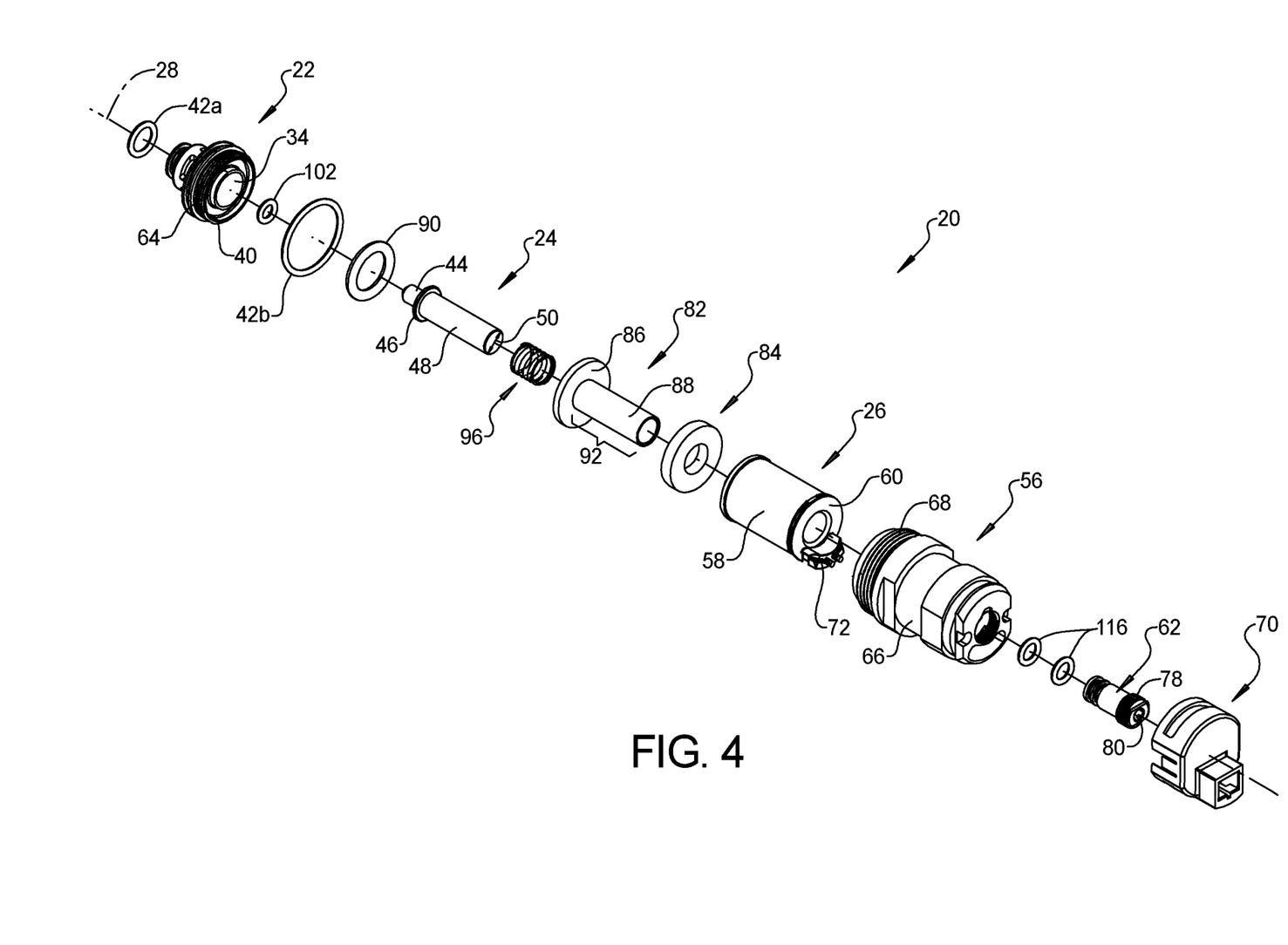
FIG. 4 is an exploded perspective view of the exemplary normally closed solenoid operated modular valve shown in FIG. 1.
Figure 5:
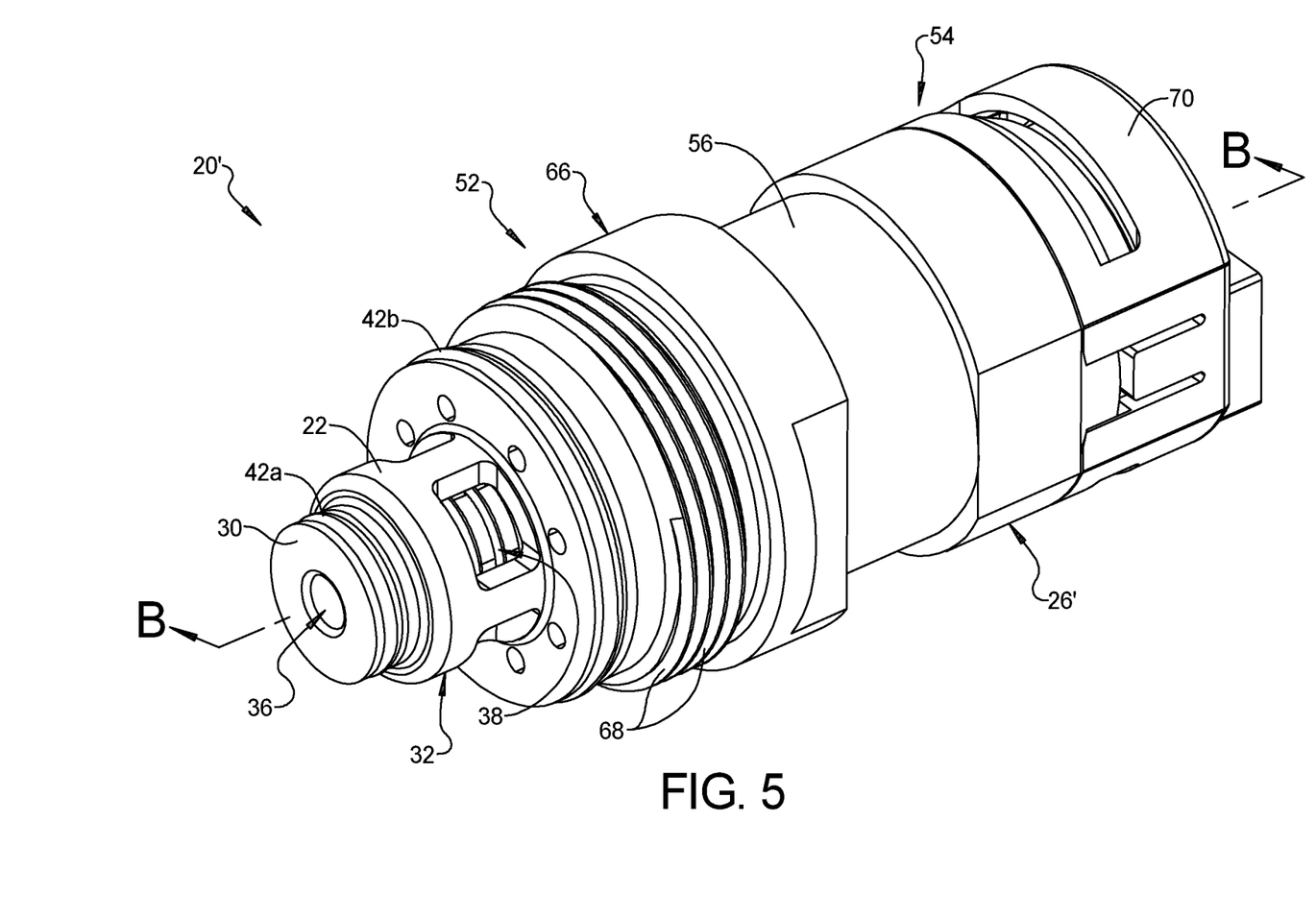
FIG. 5 is a front perspective view of an exemplary normally open solenoid operated modular valve constructed in accordance with the teachings of the present disclosure.

With reference to FIGS. 1-4, a normally closed solenoid operated modular valve 20 is illustrated. The normally closed solenoid operated modular valve 20 includes a valve body 22, a valve member 24 slidingly received in the valve body 22, and a solenoid 26 that moves the valve member 24 relative to the valve body 22 along a longitudinal axis 28 between a closed position (FIG. 2) and an open position (FIG. 3). The valve body 22 has an end face 30, a side face 32, and an inner bore 34. An outlet port 36 in the end face 30 is disposed in fluid communication with the inner bore 34 of the valve body 22. An inlet port 38 in the side face 32 is disposed in fluid communication with the inner bore 34 of the valve body 22. The valve body 22 also includes a connection end 40 that is opposite the end face 30. The valve body 22 may be made of a wide variety of different materials. By way of example and without limitation, the valve body 22 may be made of a metal or a polymer. Optionally, one or more outer seals 42 may be provided along the side face 32 of the valve body 22. By way of example and without limitation, the outer seals 42a, 42b may be made of an elastomeric material, such as rubber O-rings.

The valve member 24 includes a plunger portion 44, a piston portion 46, and an armature portion 48. The plunger portion 44 of the valve member 24 is positioned in the inner bore 34 of the valve body 22 and extends along the longitudinal axis 28 towards the outlet port 36. The armature portion 48 of the valve member 24 extends along the longitudinal axis 28 from the inner bore 34 of the valve body 22 into the solenoid 26. The piston portion 46 of the valve member 24 is positioned longitudinally between the plunger portion 44 and the armature portion 48. The valve member 24 has a valve member diameter 50. The valve member diameter 50 is larger at the piston portion 46 than it is at the plunger portion 44 and the armature portion 48. The piston portion 46 of the valve member 24 is slidingly disposed in a slip fit with the inner bore 34 of the valve body 22. However, the piston portion 46 may or may not seal against the inner bore 34 of the valve body 22. In configurations where the piston portion 46 is not sealed against the inner bore 34 of the valve body 22, such as in the illustrated example, fluid entering the inner bore 34 through the inlet port 38 can flow between the piston portion 46 of the valve member 24 and the valve body 22. Although the valve member 24 could be a multi-piece assembly, in the illustrated example, the valve member 24 has one-piece unitary construction where the plunger portion 44, the piston portion 46, and the armature portion 48 are integrally part of the valve member 24.

The solenoid 26 extends longitudinally between a first end 52 and a second end 54. The solenoid 26 includes a solenoid body 56, a coil 58, a bobbin 60, and a pole piece 62. The solenoid body 56 is connected to the connection end 40 of the valve body 22 at the first end 52 of the solenoid 26. The connection end 40 of the valve body 22 may be connected to the solenoid body 56 in a number of different ways. In the example illustrated, the connection end 40 of the valve body 22 is connected to the solenoid body 56 by a threaded connection 64 located at the first end 52 of the solenoid 26. The solenoid body 56 may also include an outer surface 66 with threads 68 located at the first end 52 of the solenoid 26. The coil 58 is disposed inside the solenoid body 56. The solenoid body 56 extends radially inwardly over the coil 58 at the second end 54 of the solenoid 26 and is attached to an end cap 70. Although other constructions are possible, in the illustrated example, the coil 58 is an electrically conductive wire that is wound annularly about the bobbin 60. By way of example and without limitation, the coil 58 may be made of copper wire. An electrical connector 72 is electrically connected to the coil 58. The electrical connector 72 extends through the solenoid body 56 and the end cap 70 to provide an interface for connection to a power source (not shown).

The coil 58 generates an electro-magnetic field in response to electricity flowing through the coil 58. The pole piece 62 extends into the coil 58 from the second end 54 of the solenoid 26 and the armature portion 48 of the valve member 24 extends into the coil 58 from the first end 52 of the solenoid 26. In the closed position (FIG. 2), the pole piece 62 and the armature portion 48 of the valve member 24 are longitudinally spaced by a gap 74. The pole piece 62 and the armature portion 48 of the valve member 24 are made of a magnetic material. The electro-magnetic field generated by the coil 58 causes the pole piece 62 to apply an electro-magnetic force 76 to the valve member 24 that pulls (i.e., attracts) the armature portion 48 of the valve member 24 towards the pole piece 62. The electro-magnetic force 76 that the solenoid 26 applies to the valve member 24 causes the valve member 24 to move relative to the valve body 22 along the longitudinal axis 28 towards the open position. As a result, the gap 74 between the armature portion 48 of the valve member 24 and the pole piece 62 is reduced or eliminated when the valve member 24 is in the open position (FIG. 3).

Optionally, the pole piece 62 is movably positioned in the bobbin 60 and further includes a threaded end 78 that is threadably engaged with the solenoid body 56. The threaded end 78 of the pole piece 62 permits adjustment of the longitudinal position of the pole piece 62 relative to the bobbin 60. Rotation of the pole piece 62 relative to the solenoid body 56 changes the stroke length of the valve member 24 (i.e., the distance the valve member 24 travels along the longitudinal axis 28 between the open and closed positions). As shown in the illustrated example, the threaded end 78 of the pole piece 62 may optionally include a tool interface 80 to facilitate rotational adjustment of the pole piece 62 relative to the solenoid body 56.

The normally closed solenoid operated modular valve 20 includes a first bushing 82 and a second bushing 84. The first bushing 82 has a bushing flange 86 and a cylindrical portion 88. The bushing flange 86 is positioned longitudinally between the connection end 40 of the valve body 22 and the coil 58. The bushing flange 86 therefore prevents longitudinal movement of the first bushing 82 relative to the coil 58. Optionally, an inner seal 90 may be disposed between the connection end 40 of the valve body 22 and the bushing flange 86. Although other configurations are possible, the inner seal 90 may be a rubber O-ring. The cylindrical portion 88 of the first bushing 82 extends from the bushing flange 86 and is received in the bobbin 60. The cylindrical portion 88 of the first bushing 82 has a longitudinal length 92 that extends past the gap 74 between the pole piece 62 and the armature portion 48 of the valve member 24. As a result, the cylindrical portion 88 of the first bushing 82 extends annularly about at least part of the armature portion 48 of the valve member 24 and the pole piece 62. The cylindrical portion 88 of the first bushing 82 is therefore positioned radially between the bobbin 60 and the armature portion 48 of the valve member 24 and radially between the bobbin 60 and the pole piece 62. Although the first bushing 82 could be a multi-piece assembly, in the illustrated example, the first bushing 82 has one-piece unitary construction where the bushing flange 86 and the cylindrical portion 88 are integrally part of the first bushing 82.

The second bushing 84 has a disc shape. The second bushing 84 is positioned annularly about the cylindrical portion 88 of the first bushing 82 and longitudinally between the coil 58 and the bushing flange 86 of the first bushing 82. The solenoid body 56 and the second bushing 84 cooperate to give the solenoid 26 an inwardly facing U-shaped cross-section 94 that houses the coil 58. The first bushing 82 is made of a non-magnetic material while the solenoid body 56 and the second bushing 84 are made of magnetic materials. As a result, the inwardly facing U-shaped cross-section 94 formed by the solenoid body 56 and the second bushing 84 concentrates the magnetic field generated by the coil 58 (i.e., the magnetic flux lines of the magnetic field) inwardly towards the longitudinal axis 28. This improves solenoid 26 performance and, as a result, a smaller coil 58 can be used for weight and cost savings.

In the illustrated example, the normally closed solenoid operated modular valve 20 includes a biasing member 96 that applies a biasing force 98 to the valve member 24. The biasing force 98, which operates in the opposite direction of the electro-magnetic force 76 generated by the solenoid 26, biases the valve member 24 towards the closed position (FIG. 2). As a result, the biasing member 96 will return the valve member 24 to the closed position when no electricity is flowing through the coil 58. The biasing member 96 is positioned in the inner bore 34 of the valve body 22. Although other configurations are possible, in the illustrated example, the biasing member 96 is a coil spring that extends helically around the armature portion 48 of the valve member 24 and longitudinally from the piston portion 46 of the valve member 24 to the bushing flange 86 of the first bushing 82. It should be appreciated that other configurations are possible that utilize latching solenoids or solenoids that push and pull on the valve member 24 thereby eliminating the need for a biasing member 96.

The valve body 22 of the normally closed solenoid operated modular valve 20 includes a groove 100 that is positioned longitudinally between the inner bore 34 and the outlet port 36. The groove 100 in the valve body 22 receives and supports an O-ring valve seat 102. As a result, the O-ring valve seat 102 is also positioned longitudinally between the inner bore 34 and the outlet port 36 of the valve body 22. The valve body 22 further includes a valve body abutment surface 104 that is positioned longitudinally between the groove 100 holding the O-ring valve seat 102 and the inner bore 34 of the valve body 22. The valve body abutment surface 104 is arranged at an oblique angle 106 relative to the longitudinal axis 28 and therefore has a funnel-like shape that narrows moving longitudinally from the inner bore 34 to the outlet port 36 of the valve body 22.

The valve member 24 includes a tapered end 108 that has a frustoconical shape and a valve member abutment surface 110. When the valve member 24 is in the closed position (FIG. 2), at least part of the valve member abutment surface 110 contacts the O-ring valve seat 102. Optionally, part of the valve member abutment surface 110 may also contact the valve body abutment surface 104 when the valve member 24 is in the closed position to provide a hard stop for the valve member 24. When the valve member 24 is in the open position (FIG. 3), the valve member abutment surface 110 is spaced away from the O-ring valve seat 102 by a valve clearance distance 112. The valve clearance distance 112 can be changed by adjusting the longitudinal position of the pole piece 62, as described above. As a result, a flow path 114 for fluid is formed between the valve body abutment surface 104 of the valve member 24 and the O-ring valve seat 102 when the valve member 24 is in the open position and this flow path 114 is closed (i.e., obstructed) by the valve member abutment surface 110 when the valve member 24 is in the closed position.

Although other configurations are possible, in the illustrated example, the oblique angle 106 of the valve body abutment surface 104 matches the frustoconical shape of the tapered end 108 of the valve member 24. In other words, the valve body abutment surface 104 and the valve member abutment surface 110 may be arranged at the same oblique (i.e., non-perpendicular) angle 106, relative to the longitudinal axis 28. By way of non-limiting example, the oblique angle 106 may be greater than or equal to 40 degrees and less than or equal to 50 degrees.

The O-ring valve seat 102 may be made from a wide variety of different materials. By way of example and without limitation, the O-ring valve seat 102 may be made from one of various rubber compounds or other elastomeric materials. Advantageously, the material of the O-ring valve seat 102 does not need to be bonded to the valve member 24 or secured by an adhesive. This means that the material of the O-ring valve seat 102 can be selected for its chemical resistance to degradation and/or corrosion by certain fluids instead of for its ability to bond to the material of the valve member 24 or an adhesive. By way of example and without limitation, the O-ring valve seat 102 may be made of perfluoroelastomer (FFKM). Accordingly, the integrity of the seal provided by the subject solenoid operated modular valve 20 is improved, particularly in applications where the solenoid operated modular valve 20 is used with fluids (such as ink) that attack (e.g., are corrosive to) the typical rubbers (such as nitrile rubber), bonding agents, and/or adhesives used to create a seal on the abutment surface of conventional valve members.

In configurations, such as in the illustrated embodiment, where the piston portion 46 of the valve member 24 does not seal against the inner bore 34 of the valve body 22, one or more pole piece seals 116 are provided on the pole piece 62. The pole piece seals 116 extend annularly about the pole piece 62 and are positioned radially between the pole piece 62 and the cylindrical portion 88 of the first bushing 82. The pole piece seals 116 create a static seal 118 between the first bushing 82 and the pole piece 62 such that the entire valve member 24 is positioned within a pressurized chamber 120 formed by the inner bore 34 of the valve body 22 and the space inside the first bushing 82 between the inner bore 34 and the pole piece 62. The pole piece seals 116 therefore prevent fluid and contaminants in the pressurized chamber 120 from reaching the coil 58.

The seal 118 created by the pole piece seals 116 is static because the first bushing 82 and the pole piece 62 do not move relative to one another when the valve member 24 moves between the open and closed positions. Advantageously, this decreases friction compared to arrangements where there is a sliding seal, such as where the seal is between the valve member 24 and the inner bore 34 of the valve body 22 or between the valve member 24 and the first bushing 82. In the subject design, friction is kept to a minimum because the plunger portion 44, the piston portion 46, and the armature portion 48 of the valve member 24 are free from seals. The only seal that contacts the valve member 24 is the O-ring valve seat 102 and the valve member 24 only contacts the O-ring valve seat 102 when the valve member 24 is at or near the closed position.

With reference to FIGS. 5-8, a normally open solenoid operated modular valve 20' is illustrated. The normally open solenoid operated modular valve 20' shown in FIGS. 5-8 has substantially the same valve body 22, O-ring valve seat 102, solenoid body 56, coil 58, bobbin 60, and end cap 70 as the normally closed solenoid operated modular valve 20 shown in FIGS. 1-4 and described above. In addition, the normally open solenoid operated modular valve 20' shown in FIGS. 5-8 has a valve member 24' where the tapered end 108, the plunger portion 44, and the piston portion 46 of the valve member 24' is substantially the same as the valve member 24 of the normally closed solenoid operated modular valve 20 shown in FIGS. 1-4 and described above. However, the valve member 24' in the normally open solenoid operated modular valve 20' shown in FIGS. 5-8 has a stem portion 122 that extends from the piston portion 46 of the valve member 24'. Unlike the normally closed solenoid operated modular valve 20 shown in FIGS. 1-4, the valve member 24' of the normally open solenoid operated modular valve 20' shown in FIGS. 5-8 is made of a non-magnetic material. As a result, the stem portion 122 of the valve member 24' is not influenced by the magnetic field generated by the coil 58 and the stem portion 122 does not act as an armature.

The normally open solenoid operated modular valve 20' includes a solenoid 26' with a pole piece 62' that is positioned at the first end 52 of the solenoid 26' instead of at the second end 54 of the solenoid 26' like in the configuration described above. The pole piece 62' has a pole piece flange 124 that is positioned longitudinally between the coil 58 and the connection end 40 of the valve body 22 and a cylinder portion 125 that extends from the pole piece flange 124 into the bobbin 60 from the first end 52 of the solenoid 26. The pole piece flange 124 prevents the pole piece 62' from moving longitudinally along the longitudinal axis 28 relative to the coil 58. In this embodiment, the inner seal 90 may be positioned longitudinally between the connection end 40 of the valve body 22 and the pole piece flange 124. The solenoid 26' further includes an end stop 126 that extends into the bobbin 60 from the second end 54 of the solenoid 26' and an armature 128 that is slidingly disposed in the bobbin 60 between the cylinder portion 125 of the pole piece 62' and the end stop 126.

Figure 6:
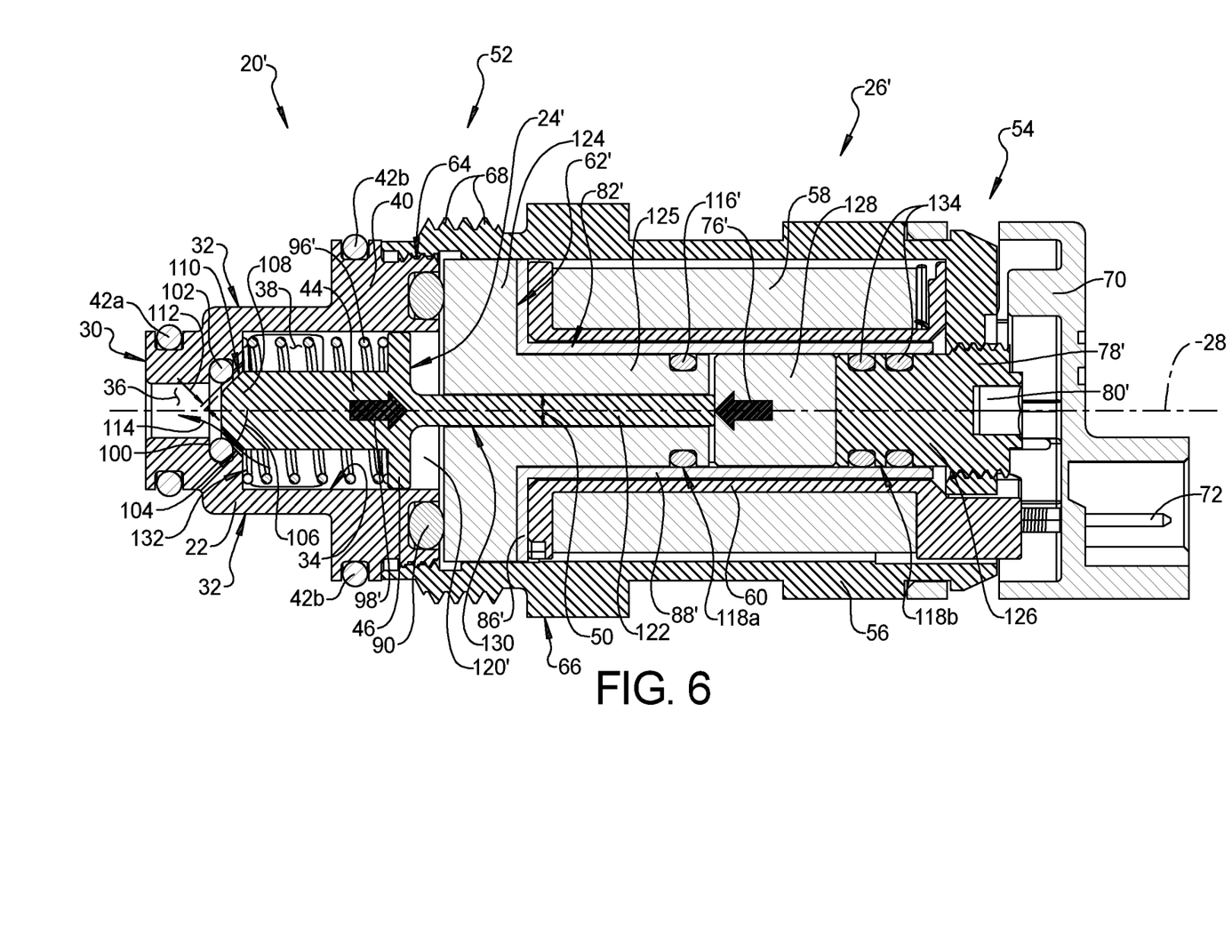
FIG. 6 is a side cross-sectional view of the exemplary normally open solenoid operated modular valve shown in FIG. 5 taken along section line B-B where the valve member is illustrated in an open position.
Figure 7:
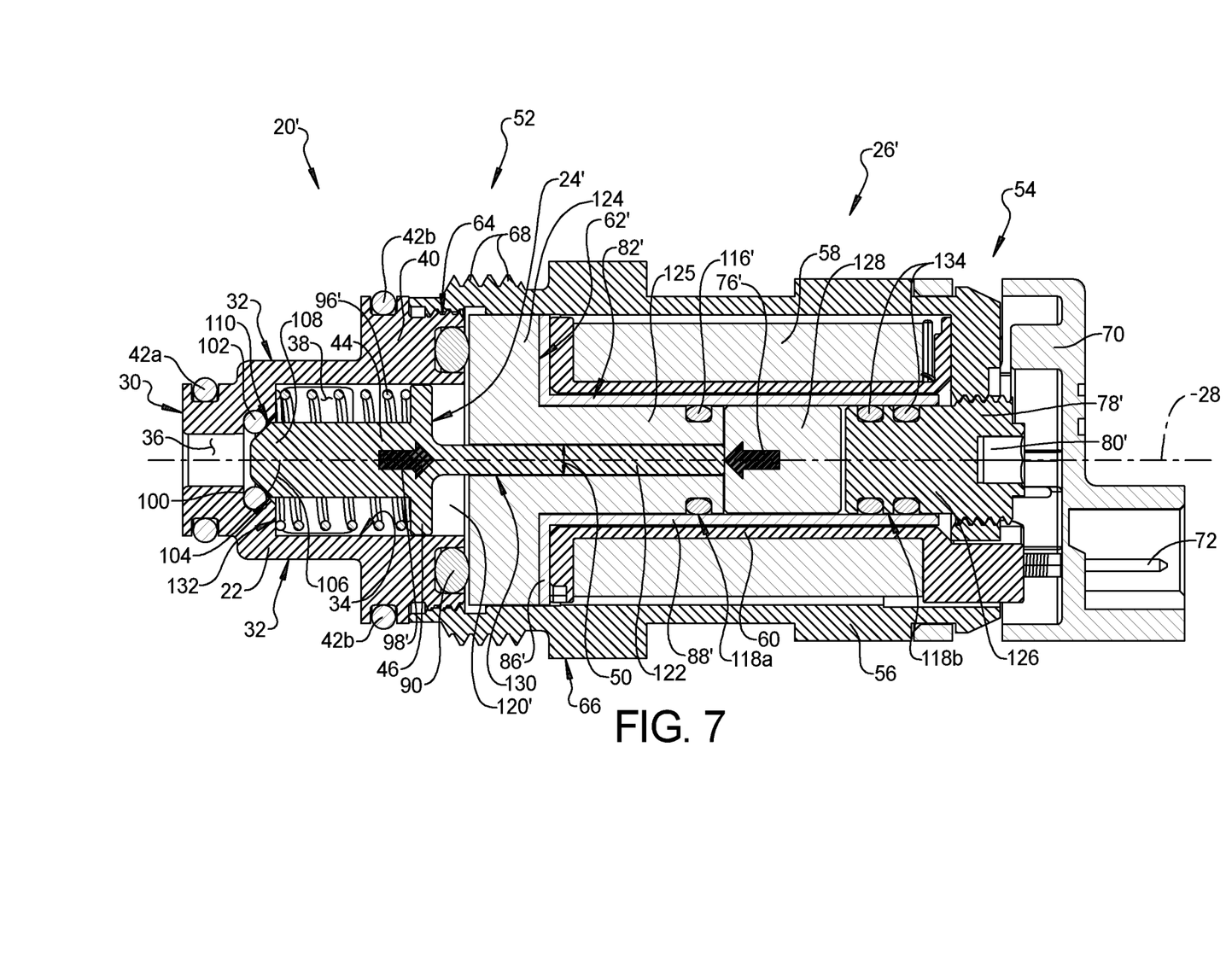
FIG. 7 is a side cross-sectional view of the exemplary normally open solenoid operated modular valve shown in FIG. 5 taken along section line B-B where the valve member is illustrated in a closed position.
Figure 8:
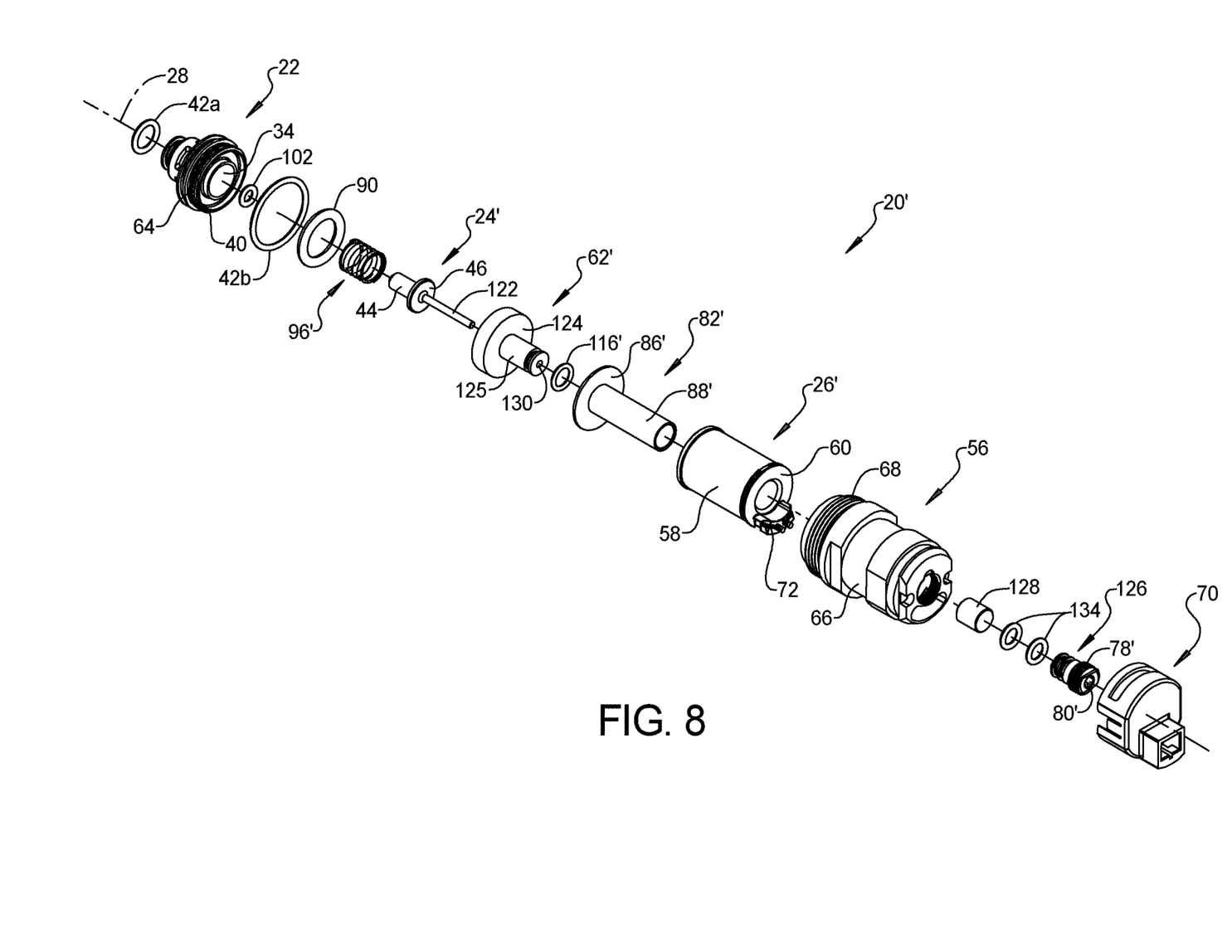
FIG. 8 is an exploded perspective view of the exemplary normally open solenoid operated modular valve shown in FIG. 5.

The pole piece 62' includes a longitudinal bore 130, aligned with the longitudinal axis 28, that extends through the pole piece 62'. The stem portion 122 of the valve member 24 is slidingly received in the longitudinal bore 130 of pole piece 62'. The stem portion 122 extends through the longitudinal bore 130 of pole piece 62' and contacts the armature 128 when the valve member 24' is in the open position (FIG. 6). The pole piece 62' and the armature 128 are made of magnetic materials. The electro-magnetic field generated by the coil 58 causes the pole piece 62' to apply an electromagnetic force 76' to the armature 128 that pulls (i.e., attracts) the armature 128 towards the pole piece 62' (towards the first end 52 of the solenoid 26). The armature 128 contacts the stem portion 122 of the valve member 24 as it is pulled towards the pole piece 62' and therefore causes the valve member 24' to move relative to the valve body 22 along the longitudinal axis 28 towards the closed position (FIG. 7).

The normally open solenoid operated modular valve 20' includes a biasing member 96', positioned in the inner bore 34 of the valve body 22, that biases the valve member 24' towards the open position (FIG. 6). In the open position, the armature 128 is positioned longitudinally adjacent to and in contact with the end stop 126 at the second end 54 of the solenoid 26'. Although other configurations are possible, in the example illustrated, the biasing member 96' is a coil spring that extends helically about the plunger portion 44 of the valve member 24' and longitudinally from the piston portion 46 of the valve member 24' to a support surface 132 disposed in the inner bore 34 of the valve body 22 adjacent to the valve body abutment surface 104. The biasing member 96' therefore applies a biasing force 98' to the valve member 24 that operates in the opposite direction as the electro-magnetic force 76' applied to the armature 128. As a result, the biasing member 96' will return the valve member 24' to the open position (FIG. 6) when no electricity is flowing through the coil 58.

Optionally, the end stop 126 is movably positioned in the bobbin 60 and further includes a threaded end 78' that is threadably engaged with the solenoid body 56. The threaded end 78' of the end stop 126 permits adjustment of the longitudinal position of the end stop 126 relative to the bobbin 60. Rotation of the end stop 126 relative to the solenoid body 56 changes the stroke length of the armature 128 and therefore the stroke length of the valve member 24' (i.e., the distance the valve member 24' travels along the longitudinal axis 28 between the open and closed positions). As shown in the illustrated example, the threaded end 78' of the end stop 126 may optionally include a tool interface 80' to facilitate rotational adjustment of the end stop 126 relative to the solenoid body 56.

The normally open solenoid operated modular valve 20' includes a bushing 82' with a bushing flange 86' and a cylindrical portion 88' that longitudinally extends from the bushing flange 86'. The bushing flange 86' is positioned longitudinally between the pole piece flange 124 and the coil 58 such that the bushing flange 86' prevents longitudinal movement of the bushing 82' relative to the coil 58. The cylindrical portion 88' of the bushing 82' is received in the bobbin 60 and extends annularly about the cylinder portion 125 of the pole piece 62', the armature 128, and at least part of the end stop 126. As a result, the cylindrical portion 88' of the bushing 82' is positioned: (1) radially between the bobbin 60 and the cylinder portion 125 of the pole piece 62', (2) radially between the bobbin 60 and the armature 128, and (3) radially between the bobbin 60 and at least part of the end stop 126. The bushing 82' and the end stop 126 are made of non-magnetic materials and the solenoid body 56 and the pole piece 62' are made of magnetic materials such that the solenoid body 56 and the pole piece 62' cooperate to concentrate magnetic flux inwardly towards the longitudinal axis 28.

In configurations, such as in the illustrated embodiment, where the piston portion 46 of the valve member 24' does not seal against the inner bore 34 of the valve body 22, a pole piece seal 116' is provided on the pole piece 62' and one or more end stop seals 134 are provided on the end stop 126. The pole piece seal 116' extends annularly about the cylinder portion 125 of the pole piece 62' and is positioned radially between the cylinder portion 125 of the pole piece 62' and the cylindrical portion 88' of the bushing 82'. The end stop seals 134 extend annularly about the end stop 126 and are positioned radially between the end stop 126 and the cylindrical portion 88' of the bushing 82'. The pole piece seal 116 creates a first static seal 118a between the bushing 82' and the pole piece 62' and the end stop seals 134 create a second static seal 118b between the bushing 82' and the end stop 126 such that the entire valve member 24' is positioned within a pressurized chamber 120' formed by the inner bore 34 of the valve body 22, the longitudinal bore 130 of the pole piece 62', and the space inside the bushing 82' between the pole piece 62' and the end stop 126. The pole piece seal 116' and the end stop seals 134 therefore prevent fluid and contaminants in the pressurized chamber 120' from reaching the coil 58.

The seals 118a, 118b created by the pole piece seal 116' and the end stop seals 134 are static because the bushing 82' does not move relative to the pole piece 62' and the end stop 126 when the valve member 24' moves between the open and closed positions. Advantageously, this decreases friction compared to arrangements where there is a sliding seal. In the subject design, friction is kept to a minimum because the plunger portion 44, the piston portion 46, and the stem portion 122 of the valve member 24' are free from seals. The only seal that contacts the valve member 24' is the O-ring valve seat 102 and the valve member 24' only contacts the O-ring valve seat 102 when the valve member 24' is at or near the closed position.

Figure 9:
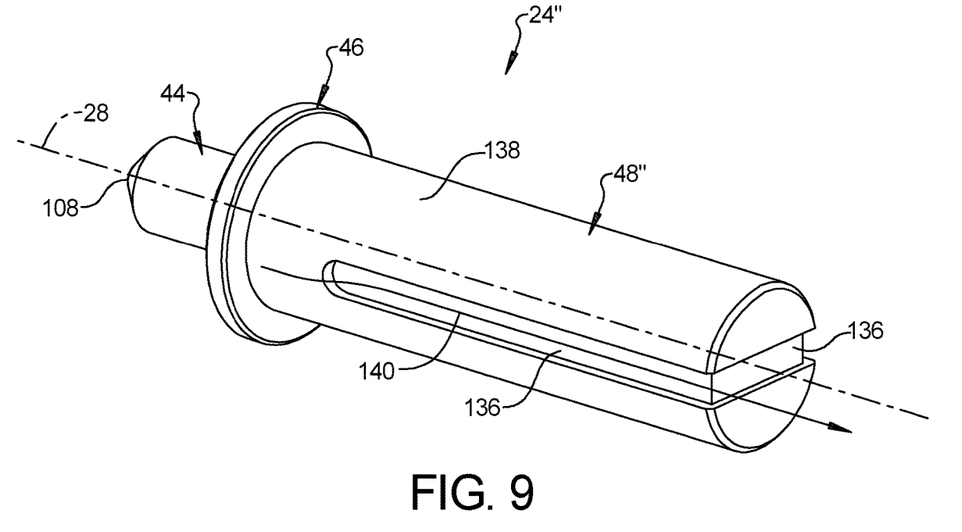
FIG. 9 is a rear perspective view of an exemplary armature of the normally closed solenoid operated modular valve shown in FIG. 1.
Figure 10:
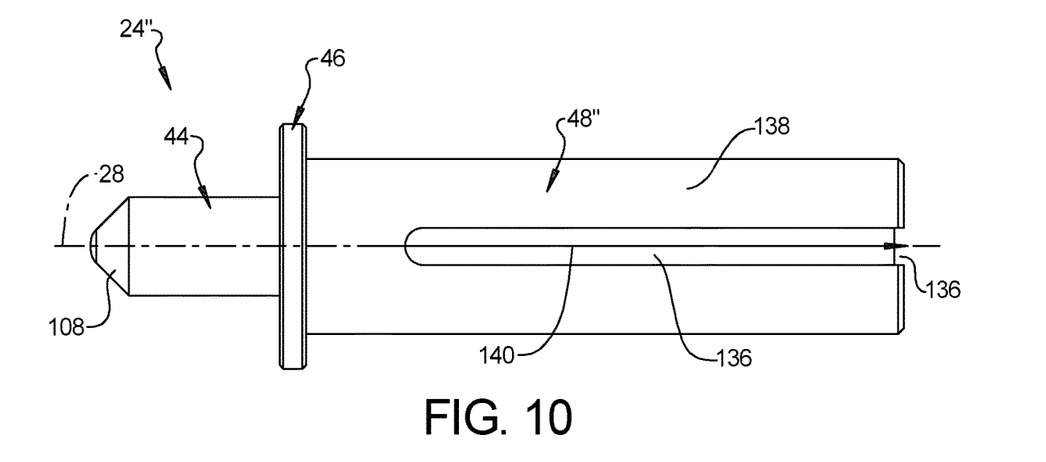
FIG. 10 is a side elevation view of the exemplary armature shown in FIG. 9.

FIGS. 9 and 10 illustrate another embodiment of a valve member 24" for use in the normally closed solenoid operated modular valve 20. In FIGS. 9 and 10, the tapered end 108, plunger portion 44, and piston portion 46 of the valve member 24" are substantially the same as the valve member 24 shown in FIGS. 1-4 and described above. However, the valve member 24 as shown in FIGS. 9 and 10 has an armature portion 48" that includes one or more longitudinal grooves 136. The longitudinal grooves 136 extend radially inwardly into the armature portion 48" of the valve member 24" from an outer cylindrical surface 138. The longitudinal grooves 136 run parallel to the longitudinal axis 28 to facilitate the longitudinal movement of the valve member 24" between the open and closed positions by providing a fluid flow path 140 along the armature portion 48" of the valve member 24". This fluid flow path 140 helps to prevent a hydraulic lock condition between the valve member 24" and the inner bore 34 and/or the first bushing 82.

Figure 11:
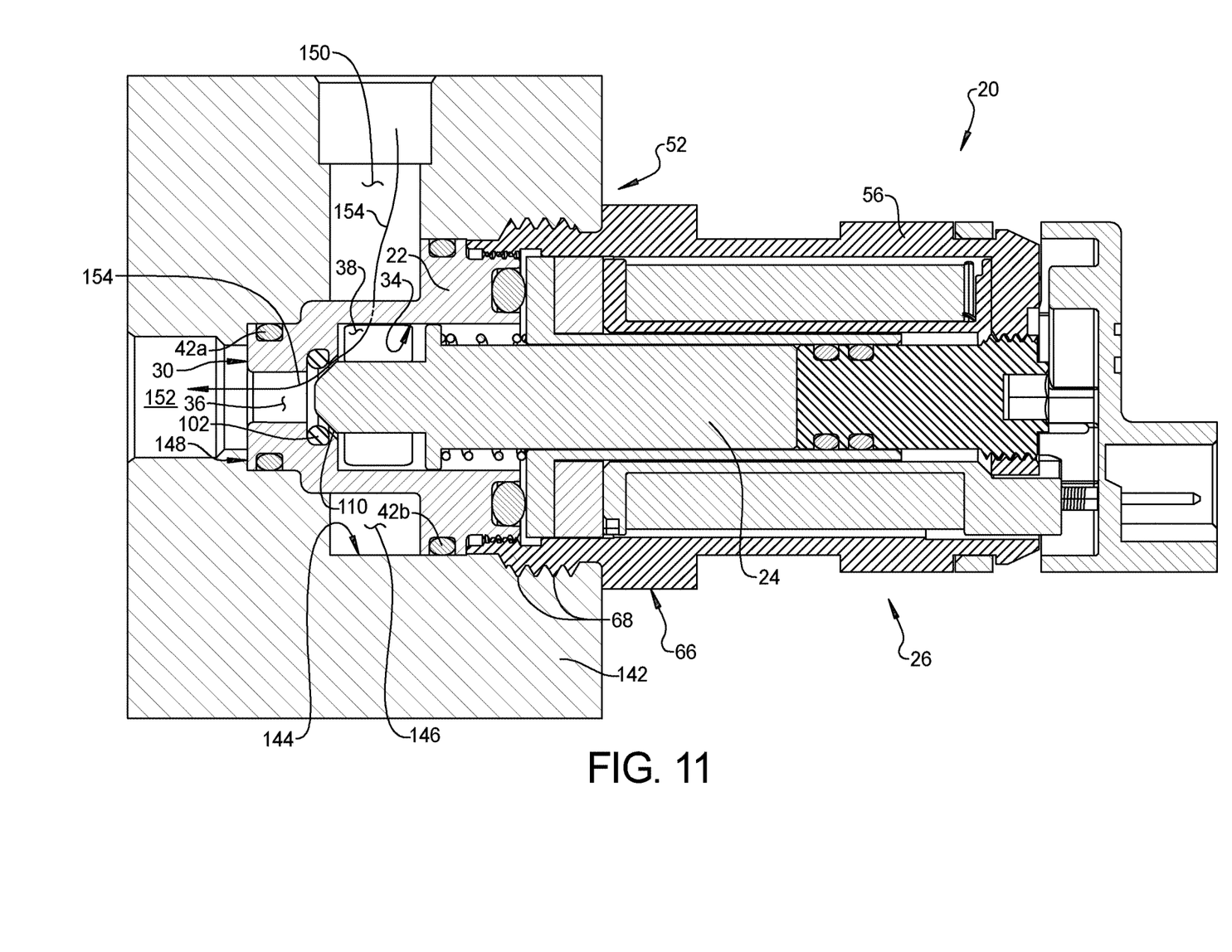
FIG. 11 is a side cross-sectional view of the exemplary normally closed solenoid operated modular valve shown in FIG. 1 where the normally closed solenoid operated modular valve is illustrated installed in an exemplary valve manifold.

Referring to FIG. 11, the normally closed solenoid operated modular valve 20 shown in FIGS. 1-4 is illustrated installed in a manifold 142. The valve body 22 is received in a bore wall 144 of a main cavity 146 of the manifold 142. The outer seals 42a, 42b contact and seal against the bore wall 144. In the illustrated example, the end face 30 of the valve body 22 directly contacts an end wall 148 of the main cavity 146. However, other configurations are possible where the end face 30 of the valve body 22 is axially spaced from the end wall 148 of the main cavity 146. The inlet port 38 in the valve body 22 is positioned in fluid communication with an inlet passageway 150 in the manifold 142 and the outlet port 36 in the valve body 22 is positioned in fluid communication with an outlet passageway 152 in the manifold 142. When the valve member 24 is in the open position, fluid is permitted to flow along the flow path 154, which extends from the inlet passageway 150 in the manifold 142, through the inlet port 38 in the valve body 22, through the inner bore 34 in the valve body 22, between the O-ring valve seat 102 and the valve member abutment surface 110, through the outlet port 36 in the valve body 22, and to the outlet passageway 152 in the manifold 142. The valve member 24 obstructs the flow path 154 when the valve member 24 is in the closed position. Although other configurations are possible, the normally closed solenoid operated modular valve 20 is secured in the main cavity 146 by the threads 68 on the outer surface 66 of the solenoid body 56, which threadably engage the bore wall 144 at a location adjacent to the first end 52 of the solenoid 26. Although the normally closed solenoid operated modular valve 20 shown in FIGS. 1-4 is illustrated in FIG. 11 as an example, it should be appreciated that the normally open solenoid operated modular valve 20' shown in FIGS. 5-8 can be installed in the same manifold 142 in the same way.

The foregoing description of the embodiments has been provided for purposes of illustration and description. It is not intended to be exhaustive or to limit the disclosure. It should be appreciated that the size and flow characteristics of the modular valves 20, 20' described herein may be varied without departing from the scope of the subject disclosure. In addition, it should be appreciated that flow through the modular valves 20, 20' described herein could be reversed, where fluid flow enters through port 36 and exits through port 38. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A solenoid operated modular valve, comprising:
   a valve body including an end face, a side face, an inner bore, an outlet port in the end face that is disposed in fluid communication with the inner bore, an inlet port in the side face that is disposed in fluid communication with the inner bore, a connection end opposite the end face, and a valve body abutment surface positioned longitudinally between the outlet port and the inner bore of the valve body;
   a valve member slidingly received in the inner bore of the valve body, the valve member extending along a longitudinal axis; and
   a solenoid including a solenoid body that is connected to the connection end of the valve body and a coil disposed inside the solenoid body, the solenoid being operable to move the valve member relative to the valve body along the longitudinal axis between an open position and a closed position,
   wherein the valve body includes an O-ring valve seat that is positioned longitudinally between the inner bore and the outlet port,
   wherein the valve member includes a tapered end that has a valve member abutment surface with a frustoconical shape,
   wherein the valve body abutment surface is arranged at an oblique angle relative to the longitudinal axis and has a funnel-like shape that narrows moving longitudinally from the inner bore to the outlet port of the valve body,
   wherein part of the valve member abutment surface is arranged to contact the O-ring valve seat and another part of the valve member abutment surface is arranged to contact the valve body abutment surface to provide a hard stop for the valve member when the valve member is in the closed position, and
   wherein the valve member abutment surface is spaced away from the O-ring valve seat when the valve member is in the open position.

2. The solenoid operated modular valve of claim 1, wherein the valve body includes a groove positioned longitudinally between the inner bore and the outlet port that receives and supports the O-ring valve seat.

3. The solenoid operated modular valve of claim 1, wherein the oblique angle of the valve body abutment surface matches the frustoconical shape of the tapered end of the valve member and is greater than or equal to 40 degrees and less than or equal to 50 degrees.

4. A solenoid operated modular valve, comprising:
   a valve body including an end face, a side face, an inner bore, an outlet port in the end face that is disposed in fluid communication with the inner bore, an inlet port in the side face that is disposed in fluid communication with the inner bore, a connection end opposite the end face, and a valve body abutment surface positioned longitudinally between the outlet port and the inner bore of the valve body;
   a valve member slidingly received in the inner bore of the valve body, the valve member extending along a longitudinal axis;
   a solenoid including a solenoid body that is connected to the connection end of the valve body and a coil disposed inside the solenoid body that extends annularly about the longitudinal axis, the solenoid being operable to move the valve member relative to the valve body along the longitudinal axis between an open position and a closed position; and
   a biasing member positioned in the inner bore of the valve body that biases the valve member towards the closed position,
   wherein the valve body includes an O-ring valve seat that is positioned longitudinally between the inner bore and the outlet port,
   wherein the valve body abutment surface is arranged at an oblique angle relative to the longitudinal axis and has a funnel-like shape that narrows moving longitudinally from the inner bore to the outlet port of the valve body,
   wherein the valve member includes a tapered end that has a valve member abutment surface with a frustoconical shape,
   wherein part of the valve member abutment surface is arranged to contact the O-ring valve seat and another part of the valve member abutment surface is arranged to contact the valve body abutment surface to provide a hard stop for the valve member when the valve member is in the closed position, and wherein the valve member abutment surface is spaced away from the O-ring valve seat when the valve member is in the open position.

5. The solenoid operated modular valve of claim 4, wherein the solenoid extends between a first end and a second end, the valve body connected to the first end of the solenoid, wherein the solenoid includes a pole piece that extends into the coil from the second end of the solenoid, and wherein the valve member has an armature portion that extends into the coil from the first end of the solenoid.

6. The solenoid operated modular valve of claim 5, wherein the solenoid includes a bobbin supporting the coil, the coil extending annularly about the bobbin.

7. The solenoid operated modular valve of claim 6, further comprising:
a first bushing including a bushing flange and a cylindrical portion that extends from the bushing flange, the bushing flange positioned longitudinally between the connection end of the valve body and the coil such that the bushing flange prevents longitudinal movement of the first bushing relative to the coil, the cylindrical portion of the first bushing being received in the bobbin and extending annularly about at least part of the armature portion of the valve member and the pole piece, and
at least one pole piece seal that extends annularly about the pole piece and is positioned radially between the pole piece and the cylindrical portion of the first bushing, the at least one pole piece seal creating a static seal between the first bushing and the pole piece such that the entire valve member is positioned within a pressurized chamber formed by the inner bore of the valve body and space inside the first bushing between the inner bore and the pole piece.

8. The solenoid operated modular valve of claim 7, further comprising:
a second bushing having a disc shape that is positioned annularly about the cylindrical portion of the first bushing and longitudinally between the coil and the bushing flange of the first bushing,
wherein the solenoid body and the second bushing cooperate to give the solenoid an inwardly facing U-shaped cross-section that houses the coil,
wherein the first bushing is made of a non-magnetic material, and
wherein the solenoid body and the second bushing are made of magnetic materials such that the inwardly facing U-shaped cross-section formed by the solenoid body and the second bushing concentrates magnetic flux inwardly towards the longitudinal axis.

9. The solenoid operated modular valve of claim 6, wherein the pole piece is movably positioned in the bobbin and further includes a threaded end, threadably engaged with the solenoid body, that permits adjustment of a longitudinal position of the pole piece and therefore a stroke length of the valve member by rotation of the pole piece relative to the solenoid body.

10. The solenoid operated modular valve of claim 5, wherein the valve member further includes a plunger portion adjacent to the tapered end and a piston portion, positioned longitudinally between the plunger portion and the armature portion, that is slidingly disposed in a slip fit with the inner bore of the valve body and wherein the biasing member is positioned longitudinally between the piston portion of the valve member and the bushing flange of the first bushing.

11. The solenoid operated modular valve of claim 5, wherein the armature portion of the valve member includes an outer cylindrical surface and at least one longitudinal groove in the outer cylindrical surface that extends parallel to the longitudinal axis to facilitate longitudinal movement of the valve member between the open position and the closed position by providing a fluid flow path along the armature portion of the valve member that prevents hydraulic lock.

12. A solenoid operated modular valve, comprising:
a valve body including an end face, a side face, an inner bore, an outlet port in the end face that is disposed in fluid communication with the inner bore, an inlet port in the side face that is disposed in fluid communication with the inner bore, and a connection end opposite the end face, and a valve body abutment surface positioned longitudinally between the outlet port and the inner bore of the valve body;
a valve member slidingly received in the inner bore of the valve body, the valve member extending along a longitudinal axis;
a solenoid including a solenoid body that is connected to the connection end of the valve body and a coil disposed inside the solenoid body that extends annularly about the longitudinal axis, the solenoid being operable to move the valve member relative to the valve body along the longitudinal axis between an open position and a closed position; and
a biasing member positioned in the inner bore of the valve body that biases the valve member towards the open position,
wherein the valve body includes an O-ring valve seat that is positioned longitudinally between the inner bore and the outlet port,
wherein the valve member includes a tapered end that has a valve member abutment surface with a frustoconical shape,
wherein the valve body abutment surface is arranged at an oblique angle relative to the longitudinal axis and has a funnel-like shape that narrows moving longitudinally from the inner bore to the outlet port of the valve body,
wherein part of the valve member abutment surface is arranged to contact the O-ring valve seat and another part of the valve member abutment surface is arranged to contact the valve body abutment surface to provide a hard stop for the valve member when the valve member is in the closed position, and
wherein the valve member abutment surface is spaced away from the O-ring valve seat when the valve member is in the open position.

13. The solenoid operated modular valve of claim 12, wherein the solenoid extends between a first end and a second end, wherein the valve body is connected to the first end of the solenoid, and wherein the solenoid includes a pole piece having a pole piece flange positioned longitudinally between the coil and the connection end of the valve body and a cylinder portion that extends from the pole piece flange into the coil from the first end of the solenoid, an end stop that extends into the coil from the second end of the solenoid, and an armature slidingly disposed in the coil between the cylinder portion of the pole piece and the end stop.

14. The solenoid operated modular valve of claim 13, wherein the solenoid includes a bobbin supporting the coil, the coil extending annularly about the bobbin.

15. The solenoid operated modular valve of claim 14, further comprising:
a bushing including a bushing flange and a cylindrical portion that extends from the bushing flange, the bushing flange positioned longitudinally between the pole piece flange and the coil such that the bushing flange prevents longitudinal movement of the bushing relative to the coil, the cylindrical portion of the bushing being received in the bobbin and extending annularly about the cylinder portion of the pole piece, the armature, and at least part of the end stop;

at least one pole piece seal that extends annularly about the cylinder portion of the pole piece and is positioned radially between the cylinder portion of the pole piece and the cylindrical portion of the bushing, the at least one pole piece seal creating a first static seal between the bushing and the pole piece; and at least one end stop seal that extends annularly about the end stop and is positioned radially between the end stop and the cylindrical portion of the bushing, the at least one end stop seal creating a second static seal between the bushing and the end stop.

16. The solenoid operated modular valve of claim 15, wherein the pole piece includes a longitudinal bore extending therethrough, wherein the valve member includes a plunger portion adjacent to the tapered end, a stem portion that extends through the longitudinal bore of the pole piece and contacts the armature, and a piston portion, positioned longitudinally between the plunger portion and the stem portion, that is slidingly disposed in a slip fit with the inner bore of the valve body, and wherein the biasing member is positioned longitudinally between the piston portion of the valve member and a support surface disposed in the inner bore of the valve body adjacent to the valve body abutment surface.

17. The solenoid operated modular valve of claim 16, wherein the first and second static seals provide a pressurized chamber within which the entire valve member and the entire armature are disposed, the pressurized chamber formed of the inner bore of the valve body, the longitudinal bore of the pole piece, and space inside the bushing between the cylinder portion of the pole piece and the end stop.

18. The solenoid operated modular valve of claim 15, wherein the bushing and the end stop are made of non-magnetic materials and the solenoid body and the pole piece are made of magnetic materials such that the solenoid body and the pole piece cooperate to concentrate magnetic flux inwardly towards the longitudinal axis.

19. The solenoid operated modular valve of claim 13, wherein the end stop is movably positioned in the bobbin and further includes a threaded end, threadably engaged with the solenoid body, that permits adjustment of a longitudinal position of the end stop and therefore a stroke length of the valve member by rotation of the end stop relative to the solenoid body.

20. The solenoid operated modular valve of claim 1, wherein the O-ring valve seat is made of perfluoroelastomer (FFKM).

* * * * *